United States Patent
Yoon

(10) Patent No.: US 10,334,862 B2
(45) Date of Patent: Jul. 2, 2019

(54) METHODS FOR PRESERVING PROCESSED MEATS

(71) Applicant: The Hillshire Brands Company, Chicago, IL (US)

(72) Inventor: Hyo-Jung Yoon, Naperville, IL (US)

(73) Assignee: The Hillshire Brands Company, Chicago, IL (US)

( * ) Notice: Subject to any disclaimer, the term of this patent is extended or adjusted under 35 U.S.C. 154(b) by 0 days.

(21) Appl. No.: 13/913,154

(22) Filed: Jun. 7, 2013

(65) Prior Publication Data
US 2013/0330441 A1    Dec. 12, 2013

Related U.S. Application Data

(60) Provisional application No. 61/656,683, filed on Jun. 7, 2012.

(51) Int. Cl.
A23B 4/12    (2006.01)

(52) U.S. Cl.
CPC ..................... A23B 4/12 (2013.01)

(58) Field of Classification Search
CPC .... A23B 4/20; A23B 4/12; A23B 4/22; A23B 7/154; A23B 7/10; A23B 5/14; A23B 9/26; A23L 1/3014; A23L 1/317; A23L 1/3175; A23L 1/00; A23L 2/44; A23L 3/3454; A23L 3/3508; A23L 3/3571; A23L 1/0345; A23L 1/31; A23L 1/31472; A23L 1/3182
USPC .............................................. 426/7, 105, 92
See application file for complete search history.

(56) References Cited

U.S. PATENT DOCUMENTS

| 3,159,490 | A | * | 12/1964 | Hussong | ............ | A23C 19/0321 |
| | | | | | | 426/36 |
| 2002/0146490 | A1 | * | 10/2002 | Lamp | ..................... | A21D 10/00 |
| | | | | | | 426/120 |
| 2007/0148323 | A1 | * | 6/2007 | Dingman | ............... | A23K 10/20 |
| | | | | | | 426/646 |
| 2011/0028550 | A1 | * | 2/2011 | Campano et al. | ............ | 514/557 |
| 2014/0296571 | A1 | | 10/2014 | Green et al. | | |
| 2015/0038735 | A1 | | 2/2015 | Ozmeral et al. | | |

FOREIGN PATENT DOCUMENTS

| WO | WO 2012/064883 | 3/2012 |
| WO | WO 2014/160846 | 8/2014 |

OTHER PUBLICATIONS

Piveteau, P. Lait, 79: 23-41 (1999).*
Brendehaug, J. et al. Dairy Sci. 68: 281-289 (1985).*
RU002284115C2 (Sep. 27, 2006)—English Abstract.*
Ogden, S. K. et al. Lebensm. Wiss. u.-Technol. 29: 227-233 (1996).*
Glass, K. A. et al. 2007. J. Food Protection. 70: 2306-2312 (Year: 2007).*
Glass, K. A. et al. 2007. J. Food. Protec. 70: 2306-2312 (Year: 2007).*
RU-2-284-115-2006. Machine Translation. (Year: 2006).*
Connett, R. J. et al. 1996. Handbook of Physiology. Chapter 19: Control of Glycolysis and Glycogen Metabolism. (Year: 1996).*
James A. Barnett, A history of research on yeast 5: the fermentation pathway, 2003, 35 pages, www.interscience.wiley.com.

* cited by examiner

*Primary Examiner* — Hamid R Badr
(74) *Attorney, Agent, or Firm* — Duane Morris LLP

(57) ABSTRACT

A method includes preserving a meat product with propionic acid, the method including contacting meat with exogenous enzymes, maintaining the meat-enzyme mixture for a sufficient period and at a sufficient temperature for the enzyme to react with one or more meat substrates and produce propionic acid, and heating the meat-enzyme mixture for a sufficient period and at a sufficient temperature to inactivate the enzymes and cook the meat.

15 Claims, No Drawings

US 10,334,862 B2

METHODS FOR PRESERVING PROCESSED MEATS

TECHNICAL FIELD

The present technology relates generally to the field of processed meats. Specifically, the technology relates to methods for naturally preserving processed meats by adding exogenous enzymes or microorganisms producing enzymes that promote the production of preservative compounds.

BACKGROUND

Propionic acid is used in processed meats to control bacterial and fungal growth. Typically, the acid is added to meat products in the form of sodium, potassium, or calcium salts. However, where propionic acid is direct added to a meat, the meat may not generally be labeled as a natural product. Accordingly, there is a need for methods to preserve meat products using propionic acid which allow for desirable natural product labeling.

SUMMARY

In one aspect, a method includes contacting meat having one or more meat substrates, with one or more exogenous enzymes or microorganisms that produce enzymes at a temperature compatible with the storage or processing of meat products to form a meat-enzyme mixture; maintaining the meat-enzyme mixture at an enzyme-active temperature for the exogenous enzymes for a period of time sufficient to permit the exogenous enzymes to react with the one or more meat substrates; wherein the reaction of the exogenous enzymes with the one or more meat substrates produces propionic acid. The method may further include heating the meat-enzyme mixture to a sufficient temperature and for a sufficient period of time to inactivate, or reduce the activity of, the exogenous enzymes. In any of the above embodiments, the contacting includes adding the exogenous enzymes during processing of the meat. In any of the above embodiments, the processing of the meat includes tumbling, mixing, massaging, stuffing, holding, slicing, dicing, mashing, mincing, or pureeing. In any of the above embodiments, the exogenous enzymes include a dehydroxylase. In any of the above embodiments, method includes contacting the meat with microorganism comprising *Propionibacterium* sp.

In any of the above embodiments, the one or more meat substrates includes lactate, glycogen, fatty acids, amino acids, and propionyl Co-A. In any of the above embodiments, the one or more meat substrates includes fatty acids having an odd number of carbons. In any of the above embodiments, the one or more meat substrates include isoleucine, valine, threonine, and/or methionine.

In any of the above embodiments, the exogenous enzyme active temperature is from about 3° C. to about 50° C. and the enzymes are inactivated or reduced in activity at a temperature of about 65° C. to about 100° C. In any of the above embodiments, the exogenous enzymes contacted with the meat at about 0.01 wt % to about 3.0 wt %. In any of the above embodiments, the propionic acid is produced in situ in the meat by exogenous enzymes distributed throughout the meat product. In any of the above embodiments, the reaction of the exogenous enzymes with the one or more meat substrates produces a meat-propionic acid mixture that is a batch source of propionic acid. In some embodiments, the methods may also include mixing the meat-propionic acid mixture with additional meat. In some embodiments, the methods may also include the meat-propionic acid mixture.

DETAILED DESCRIPTION

Definitions

The definition of certain terms used herein are provided below. Unless defined otherwise, all technical and scientific terms used herein have the same meaning as commonly understood by one of ordinary skill in the art to which the present disclosure pertains.

As used herein, the singular forms "a," "an," and "the" include plural referents unless the context clearly indicates otherwise. For example, reference to "an enzyme" or "the enzyme" includes a combination of two or more enzymes, and the like.

As used herein, "propionic acid" refers to a carboxylic acid of the formula $CH_3CH_2COOH$. Propionic acid is produced biologically as its coenzyme A ester, propionyl-CoA, from the metabolic breakdown of fatty acids containing odd numbers of carbon atoms, and also from the breakdown of some amino acids. Bacteria of the genus *Propionibacterium* produce propionic acid as the end product of their anaerobic metabolism. Propionic acid may also be generated from lactate by removal of the C2 hydroxyl group by a dehydroxylase. As used herein, "propionates" refers to the anion ($CH_3CH_2CO^-$), salt, and ester forms of propionic acid.

As used herein, "meat product" refers to all forms of animal flesh, including muscle, fat, organs, skin, bones, body fluids, and like components of an animal. As used herein, the term includes but is not limited to, the flesh of mammals, birds, fish, reptiles, amphibians, snails, clams, crustaceans, and other forms of seafood. The term encompasses whole or partitioned animal flesh, alone or in combination with other ingredients, including but not limited to, vegetables, spices, seasonings, dairy products (e.g., milk, cream, whey, buttermilk, cheese, ghee, yogurt, clabber, butter, casein, anhydrous milk fat), oils, flavorings, emulsifiers, or any other ingredient compatible with the preparation and consumption of meat products. Examples of meat products include but are not limited to processed meats such as cured meats, sectioned and formed meats, whole meats, and ground meats. As used herein, the term encompasses meat products intended for human consumption and non-human consumption, such as for example, lunch meats, hot dogs, etc., pet foods, and livestock feed. In some embodiments, the meat product is a hot dog. In some embodiments, the meat product is a lunchmeat.

As used herein, "processing" refers to the manipulation of a meat product during manufacture of a consumer product prior to cooking of the meat product. Processing may occur in a single step or in multiple steps, and may include extracting myofibrillar proteins, chemical/biochemical treatment, partitioning, combining with other ingredients, etc. Extracting proteins and combining with other ingredients may include, for example, tumbling, mixing, or massaging of meat and ingredients. Partitioning of the meat product may include, for example, macerating, slicing, dicing, mashing, mincing, grinding, extruding, or pureeing of a meat product, and/or shaping, stuffing into casing, or otherwise conforming the meat product into a desired three-dimensional structure. Chemical/biochemical treatment may include, for example, curing. One of skill in the art will understand that conditions for meat processing are determined in part by industry standards, and that meat products are generally maintained at about 4° C. to about 15° C.

during processing. In some embodiments, meat processing comprises slicing, dicing, mashing, mincing, or pureeing uncooked meat or partially cooked meat.

As used herein, "preservation" of a meat product refers to the addition of one or more substances that inhibit bacterial and/or fungal growth including, but not limited to, for example, propionic acid. As used herein, a "naturally preserved" meat product refers to a meat product containing preservatives derived from natural sources or processes, as opposed to chemically synthesized or chemically purified. In some embodiments, natural preservation is achieved by the addition of exogenous enzymes that act on substrates present in the meat product to generate a preservative compound in situ in the meat product. In some embodiments, the exogenous enzymes promote the conversion of substrates present in the meat product to propionic acid. In some embodiments, natural preservation is achieved by adding to the meat product a mixture of plant or animal products in which a natural preservative was generated previously through the addition of exogenous enzymes. In some embodiments, natural preservation is achieved by adding to the meat product one or more bacterial strains that produce preservative compounds as metabolic products. In some embodiments, the bacteria comprise bacteria of the genus *Propionibacterium*. In some embodiments, the bacteria comprise *Propionibacterium freudenreichii*.

As used herein, "enzyme inactivation" refers to the rendering of an enzyme non-functional with respect to modification of a substrate. One of skill in the art will understand that enzyme inactivation may be accomplished by exposing an enzyme to sub-optimal or extreme conditions incompatible with sustained activity, including but not limited to temperature and pH conditions. In some embodiments, enzymes are heat inactivated. In some embodiments, the heat inactivation occurs during the cooking of a meat product.

As used herein, "exogenous enzyme" refers to an enzyme which is not inherent to the animal flesh that constitutes the meat or meats being used in the production of a meat product, but rather, exogenous enzymes are added to the meat by an operator. Exogenous enzymes are defined according to the source of the enzyme, and not the nature of the enzyme. Enzymes derived from or normally present in animal flesh constitute exogenous enzymes where they are not inherent to the particular sample of meat product being processed, but rather the enzymes are added to the meat by the operator. Other exogenous enzymes may be of a plant-based origin for use in the meat products. Exogenous enzymes may be purified, substantially purified, partially purified, or non-purified. As used herein, "purified" refers to being substantially free of compounds normally in contact or associated with the enzyme in the environment from which it originates. Exogenous enzymes may be natural, synthetic, semi-synthetic, or recombinant. In some embodiments, the exogenous enzyme comprises a raw material enriched for one or more enzymes that is used to generate a meat-enzyme mixture.

The exogenous enzymes may include a mixture of enzymes that have complementary modes of action. For example, the exogenous enzymes may include enzymes that promote or carryout glycolysis to produce glycogen, the products of which may be used by other enzymes to convert the glycogen to propionic acid via one or more steps. The exogenous enzymes that promote or carryout glycolysis include, but are not limited to, hexokinase, phosphoglucose isomerase, phosphofructo kinase, aldolase, triosephosphate isomerase, glyceraldehyde phosphate dehydrogenase, phosphoglycerate kinase, phosphoglycerate mutase, enolase, or pyruvate kinase.

Other exogenous enzymes promote the conversion of glycogen to glucose 6-phosphate. For example, the exogenous enzymes may include glycogen phosphorylase or phosphoglucomutase. Other exogenous enzymes may include enzymes that convert pyruvate to lactate. Other exogenous enzymes include dehydrogenases such as, but limited to lactate dehydrogenase. Yet other exogenous enzymes may include dehydroxylases. Some exogenous enzymes are those that convert lactate to propionate by selectively cleaving the hydroxyl group from the lactate.

The exogenous enzymes may include enzymes that promote the production of coenzyme-A ester of propionic acid (propionyl Co-A) or the metabolism of propionyl Co-A. For example, the exogenous enzymes may include enzymes that promote the metabolism of odd-chain fatty acids and/or amino acids to produce propionyl Co-A. Illustrative amino acids include isoleucine, valine, threonine, and/or methionine. The exogenous enzymes may likewise include enzymes of the branched chain alpha keto acid dehydrogenase complex, which convert alpha-ketobutyric acid to propionyl Co-A.

The exogenous enzymes may include enzymes involved in anaerobic fermentation. In some embodiments, the enzymes convert lactate to propionate, acetate, and $CO_2$. In some embodiments, the enzymes are produced by bacteria. In some embodiments, the bacteria may include those from the genus *Propionibacterium*. One illustrative example of such a bacterium is *Propionibacterium freudenreichii*.

The exogenous enzymes may include enzymes that convert glycogen to lactate. In some embodiments, the enzymes accelerate natural anaerobic metabolism. In some embodiments the exogenous enzyme is a cold-acting enzyme.

As used herein, "cold-active" refers to an enzyme having maximal catalytic activity at temperatures below about 40° C. and an active temperature of about 3° C. to about 40° C. Cold-active enzymes are thermolabile and are typically inactivated at temperatures above the optimal active temperature. As used herein, the term encompasses enzymes that are naturally exogenous, as well as enzymes that are engineered to be exogenous, such as by selective pressure or rationale re-design of the enzyme active site. As used herein, cold-active enzyme encompasses enzymes isolated or purified from a natural source, as well as enzymes produced recombinantly, such as for example, through expression of a recombinant gene in prokaryotic or eukaryotic cells. In some embodiments, the optimal active temperature of the exogenous enzyme is from about 3° C. to about 40° C. In some embodiments, the optimal active temperature of the cold-active enzyme is about 3° C., 5° C., 7° C., 9° C., 11° C., 13° C., 15° C., 17° C., 19° C., 21° C., 23° C., 25° C., 27° C., 29° C., 31° C., 33° C., 35° C., 37° C., 39° C., or 40° C. In some embodiments, the cold-active enzyme is inactivated at a temperature of about 50° C. to about 75° C. In some embodiments, the cold-active enzyme is inactivated at a temperature of about 65° C. to about 75° C. In some embodiments, the cold-active enzyme is inactivated at a temperature of about 50° C., 52° C., 54° C., 56° C., 58° C., 60° C., 62° C., 64° C., 66° C., 68° C., 70° C., 72° C., 74° C., or 75° C. Examples of cold- active enzymes include but are not limited to proteases, endopeptidases, exopeptidases, lipases, phospholipases, amylases, collagenases, kinases, isomerases, dehydroxylases, dehydrogenases, mutases, phosphorylases, enolases, and hydrolases naturally having or engineered to have active temperatures from about 3° C. to about 40° C.

As used herein, "cook" or "cooking" refers to the heating of a meat product to a sufficient temperature and for a sufficient period of time to convert the product from its natural raw state to a state compatible with consumption of the meat product. What constitutes a state compatible with consumption of the meat product will vary according to the composition of the meat product (e.g., type of meat, identity and amount of additional ingredients) and the nature or form of the meat product (e.g., sectioned and formed meats, whole meats, ground meats). Generally, cooking is accomplished by raising the temperature of the meat product to a temperature of about 68° C. to about 74° C. In some embodiments, the meat product is raised to a temperature of about 68° C., about 69° C., about 70° C., about 71° C., about 72° C., about 73° C., or about 74° C. In some embodiments, the meat product is raised to a temperature above 74° C.

As used herein, "hold time" and "hold temperature" refer to the period of time for which a meat-enzyme mixture is maintained at an enzyme-active temperature, and the temperature at which it is maintained. The hold time and hold temperature will vary according to a number of factors, including but not limited to, the properties of the enzyme or enzymes in use, the composition of the meat product, and the desired results. In some embodiments the hold temperature ranges from about 3° C. to about 40° C. In some embodiments, the hold temperature ranges from about 40° C. to about 60° C. The hold temperature may be the optimal active temperature of the enzyme in use, or alternatively, the hold temperature may be a sub-optimal active temperature of the enzyme in use. In some embodiments, the hold temperature is within about 5° C. of the optimal active temperature of the enzyme or enzymes in use. In some embodiments, the hold temperature is within about 1° C., about 2° C., about 3° C., about 4° C., about 6° C., about 7° C., about 8° C., about 9° C., about 10° C., about 11° C., about 12° C., about 13° C., about 14° C., about 15° C., about 16° C., about 17° C., about 18° C., about 19° C., or about 20° C. of the optimal active temperature of the enzyme or enzymes in use. The hold temperature may be adjusted or varied during the hold time to account for a wide variety of conditions and equipment variations. For example, the meat product may be maintained at a first hold temperature for a first hold time, a second hold temperature for a second hold time, a third hold temperature for a third hold time, etc. In some embodiments, the hold time is about 1 to about 10 hours. In some embodiments, the hold time is from about 1 to about 30 hours. In some embodiments, the hold time is about 1, about 2, about 3, about 4, about 5, about 6 about 7, about 8, about 9, about 10, about 11, about 12, about 13, about 14, about 16, about 17, about 18, about 19, about 20, about 21, about 22, about 23, about 24, about 25, about 26, about 27, about 28, about 29, or about 30 hours. In some embodiments, the hold time is less than 1 hour. In some embodiments, the hold time is more than 30 hours.

As used herein, "meat substrate" refers to a compound, molecule, or macromolecule within a meat product that is a substrate for one or more enzymes in use in a given method. One of skill in the art will understand that what constitutes a meat substrate in a particular context is a function of the enzyme in use in that context. For example, where the enzyme in use is a peptidase, "meat substrate" refers to protein, peptide, or polypeptide component of the meat product on which the peptidase acts. Likewise, where the enzyme in use is a collagenase, "meat substrate" refers to the collagen component of the meat product on which the collagenase acts. Examples of meat substrates include, but are not limited to, substrates of proteases, endopeptidases, exopeptidases, lipases, phospholipases, amylases, collagenases, and hydrolases. Meat substrates include, but are not limited to, proteins, carbohydrates, lipids, or phospholipids. For example, meat substrates include, but are not limited to, actin, myosin, troponin, or tropomyosin. In some embodiments, meat substrates include muscle tissue, extracellular matrix, superficial fascia, deep fascia, tendons, ligaments or bone. In some embodiments, meat substrates include proteoglycans, glycosaminoglycans, chondroitin sulfate, dermatan sulfate, heparin sulfate, or keratan sulfate. In some embodiments, meat substrates include fatty acids, amino acids, lactate, propionate, propionyl Co-A, or glycogen.

As used herein, the terms "react" and "reaction" of an enzyme with a meat substrate refer to the physical and biochemical action of an enzyme on a meat substrate to generate an end product that differs biochemically from the starting substrate. One of skill in the art will understand that a reaction of an enzyme with a meat substrate will vary according to the precise characteristics of both the enzyme and the substrate in question. For example, where the enzyme is an endopeptidase and the substrate is a polypeptide, reaction of the enzyme with the substrate includes the hydrolysis of non-terminal peptide bonds. Likewise, where the enzyme is an exopeptidase and the substrate is a polypeptide, enzyme with the substrate includes the hydrolysis of terminal peptide bonds. In some embodiments, the enzyme reaction is allowed to go to completion, at which point there exists no additional un-reacted meat substrate in the meat product. In some embodiments, the reaction is stopped prior to completion. In some embodiments, the substrate is a primary substrate of the enzyme. In some embodiments, the substrate is a non-primary substrate of the enzyme. In some embodiments, the enzyme naturally has a high degree of specificity for one or more meat substrates. In some embodiments, the enzyme has been engineered to have a high degree of specificity for one or more meat substrates. Examples of enzymes with a high degree of specificity for one or more meat substrates include, but are not limited to proteases, endopeptidases, exopeptidases, lipases, phospholipases, amylases, collagenases, kinases, isomerases, dehydroxylases, dehydrogenases, mutases, phosphorylases, enolases, and hydrolases In some embodiments, enzymes with a high degree of specificity for meat substrates include hexokinase, phosphoglucose isomerase, phosphofructokinase, aldolase, triosephosphate isomerase, glyceraldehyde phosphate dehydrogenase, phosphoglycerate kinase, phosphoglycerate mutase, enolase, pyruvate kinase, glycogen phosphorylase, phosphoglucomutase, and lactate dehydrogenase.

As used herein, "meat-enzyme mixture" refers to a physical combination of a meat product with one or more exogenous enzymes. In some embodiments, the meat-enzyme mixture includes from about 0.01 wt % to about 1.0 wt % of one or more exogenous enzymes. In some embodiments, the meat-enzyme mixture includes from about 0.01 wt % to about 5 wt % of one or more exogenous enzymes. In some embodiments, the meat-enzyme mixture includes from about 0.01 wt % to about 1 wt % of one or more exogenous enzymes. In some embodiments, the meat-enzyme mixture includes about 0.01 wt %, about 0.05 wt %, about 0.1 wt %, about 0.15 wt %, about 0.2 wt %, about 0.25 wt %, about 0.3 wt %, about 0.35 wt %, about 0.4 wt %, about 0.45 wt %, about 0.5 wt %, about 0.55 wt %, about 0.6 wt %, about 0.65 wt %, about 0.7 wt %, about 0.75 wt %, about 0.8 wt %, about 0.85 wt %, about 0.9 wt %, about 0.95 wt %, or about 1 wt % of one or more exogenous enzymes.

As used herein, "storage temperature" refers to the temperature at which a meat product is stored prior to or subsequent to processing, or prior to or subsequent to cooking. One of skill in the art will understand that meat product storage temperatures are determined in part by industry standards, and are typically in the range of about 2° C. to about 4° C.

As used herein, "processing temperature" refers to the temperature at which a meat product is maintained during processing. One of skill in the art will understand that meat product processing temperatures are determined in part by industry standards, and are typically in the range of about 4° C. to about 15° C.

As used herein, "cook temperature" refers to the temperature is heated to convert the meat product from its natural raw state to a state compatible with consumption of the meat product. One of skill in the art will understand that meat product cooking temperatures are determined in part by industry standards, and are typically in the range of about 68° C. to about 74° C.

Methods

In general methods of meat preparation and meat products are described in which a preservative of propionic acid is generated in situ in the meat or meat product. Propionic acid has been found to act as a preservative in meats, however chemical addition of propionic acid generally will not allow for labeling of the product as a natural product. Herein, methods are described in which a naturally occurring enzyme, which is exogenous to the meat being processed or the meat product, is added, the enzyme being configured to convert naturally occurring substances in the meat to propionic acid at effective concentrations. For example, such naturally occurring substances in meat include lactic acid, which may be converted to propionic acid as shown in Scheme 1.

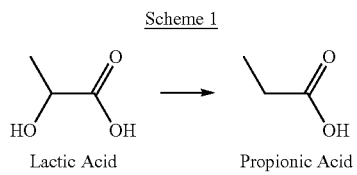

Scheme 1

Lactic Acid → Propionic Acid

In one aspect, a method is provided including contacting uncooked meat, or partially cooked meat, with one or more exogenous enzymes that promote the production of preservative compounds in the meat product.

Exogenous enzymes may be selected for the present methods based on the components of the meat product and the desired effects. For example, where a meat product contains lactate and the desired effect is to convert the lactate to propionate, a dehydroxylase is selected. Likewise, where a meat product contains pyruvate and the desired effect is to promote the conversion of pyruvate to lactate and then to propionate, lactate dehydrogenase and a dehydroxylase are selected.

Illustrative exogenous enzymes include, but are not limited to, hexokinase, phosphoglucose isomerase, phosphofructo kinase, aldolase, triosephosphate isomerase, glyceraldehyde phosphate dehydrogenase, phosphoglycerate kinase, phosphoglycerate mutase, enolase, pyruvate kinase, glycogen phosphorylase, phosphoglucomutase, and lactate dehydrogenase.

Additionally, or alternatively, exogenous enzymes may be selected based on the temperatures at which they are desired to be active and/or inactivated. For example, exogenous enzymes may be selected to be active during processing of the meat product, and inactivated during cooking of the meat product. Processing and cooking temperatures are determined in part by industry standards, and processing temperatures are typically from about 4° C. to about 15° C., and cooking temperatures are typically from about 65° C. to about 75° C. Exogenous enzymes for the methods have active temperatures from about 3° C. to about 40° C. and are heat inactivated at temperatures from about 55° C. to about 75° C. The methods provide a means to control the period for which, and the extent to which, exogenous enzymes are active within a meat product.

According to various embodiments, the exogenous enzymes have an active temperature of about 3° C., about 5° C., about 7° C., about 9° C., about 11° C., about 13° C., about 15° C., about 17° C., about 19° C., about 21° C., about 23° C., about 25° C., about 27° C., about 29° C., about 31° C., about 33° C., about 35° C., about 37° C., about 39° C., or about 40° C. In contrast, the exogenous enzymes are typically inactivated at a temperature of about 50° C. to about 75° C., or higher. This includes, but is not limited to inactivation at a temperature of about 65° C. to about 75° C. This also include individual temperatures such as about 50° C., about 52° C., about 54° C., about 56° C., about 58° C., about 60° C., about 62° C., about 64° C., about 66° C., about 68° C., about 70° C., about 72° C., about 74° C., or about 75° C. In some embodiments, the exogenous enzyme is inactivated at a temperature above 75° C. For example, up to a temperature of about 100° C., or up to about 150° C.

According to the various embodiments, preservation of a meat may be achieved by the addition of exogenous enzymes that act on substrates present in the meat product to generate a preservative compound in situ in the meat product. The preservation is achieved by adding to the meat product a mixture of plant or animal products in which a natural preservative was previously generated in situ through the addition of exogenous enzymes. For example, a purified or partially purified dehydroxylase may be added to a meat product to promote the conversion of lactate to propionic acid in situ in the meat product. Additionally or alternatively, plant or animal products in which propionic acid has been previously generated by the addition of a purified or partially purified dehydroxylase may be added to the meat product. In some embodiments, the preservation may be achieved by adding to the meat product one or more bacterial strains that produce propionic acid as a metabolic end product. The bacteria may include those of the genus *Propionibacterium*. In some embodiments, the bacteria include *Propionibacterium freudenreichii*.

The amount of exogenous enzyme added to a meat product may be determined empirically by adding one or more exogenous enzymes to the meat product in varying amounts and assessing the effects on the finished product. For example, by determining the level of propionic acid in the finished product. Additionally or alternatively, the amount of exogenous enzyme to be added to the meat product may be determined by measuring the shelf life of the finished product. One of skill in the art will understand that the shelf life of processed meat products is determined by in part industry standards and will vary according to the nature and characteristics of the meat product in question.

The total amount of exogenous enzyme added in a meat-enzyme mixture may be adjusted depending on whether a single enzyme is used or multiple enzymes are used. Likewise, the amount of enzyme added will depend on whether the source is a purified or partially purified enzyme, plant or animal products in which propionic acid has been previously generated in situ, or propionic acid-producing bacteria.

The methods may include preparing meats with high concentrations of exogenous enzymes in the meats which can then be used as starter cultures for dilution in other meats in order to achieve a desired level of propionic acid in the final meat products. Alternatively, the methods may include initially preparing meats and exogenous enzyme mixtures at concentrations which will achieve a desired level of propionic acid in the final meat product. Accordingly, in some embodiments, the meat-enzyme mixture includes from about 0.01 wt % to about 10 wt % of one or more exogenous enzymes. In some embodiments, the meat-enzyme mixture includes from about 0.01 wt % to about 5 wt % of one or more exogenous enzymes. In some embodiments, the meat-enzyme mixture includes from about 0.01 wt % to about 1 wt % of one or more exogenous enzymes. In some embodiments, each of multiple exogenous enzymes includes from about 0.01 wt % to about 1 wt % of the meat-enzyme mixture. In some embodiments, the combined amount of exogenous enzymes includes from about 0.01 wt % to about 1 wt % of the meat-enzyme mixture.

The methods include the addition of one or more exogenous enzymes to the meat product during processing of the meat product. Processing may include, but is not limited to, chemical/biochemical treatment, partitioning, combining with other ingredients, etc. In some embodiments, processing includes tumbling, mixing, massaging, macerating, slicing, dicing, mashing, mincing, grinding, extruding, or pureeing uncooked or partially meat. In some embodiments, processing includes shaping, stuffing into casing, or otherwise conforming the meat product into a desired three-dimensional structure. Conditions for meat processing are determined in part by industry standards, and meat products are generally maintained at about 4° C. to about 15° C. during processing. According to the methods, the active temperature of exogenous enzymes added to a meat product during processing may correspond to the temperature at which the meat product is maintained during processing.

In some embodiments, following addition of the exogenous enzyme to the meat product, the meat-enzyme mixture may be held at the enzyme-active hold temperature for a hold time sufficient for the enzyme to react with its meat substrate. Hold times will vary according to the particular enzyme in use, the amount of enzyme in use, and the desired effect. Suitable hold times may be determined empirically by holding test meat products for a range of times and assessing the effect on the level of preservative present in the finished product. In some embodiments, the level of propionic acid in the finished product is determined.

In some embodiments, the hold time is about 1 to about 10 hours, or more. This may include time ranges such as from about 10 to about 30 hours, as well as individual hold times. For example, the hold time may be about 1, about 2, about 3, about 4, about 5, about 6 about 7, about 8, about 9, about 10, about 11, about 12, about 13, about 14, about 16, about 17, about 18, about 19, about 20, about 21, about 22, about 23, about 24, about 25, about 26, about 27, about 28, about 29, or about 30 hours. In some embodiments, the hold time is less than 1 hour. In some embodiments, the hold time is more than 30 hours. In other embodiments, the hold time is more than 48 hours.

The hold temperature will vary according to the particular exogenous enzyme in use and the desired effect. The enzyme mixture may be maintained at a hold temperature optimal for the activity of the enzyme in use or at a sub-optimal temperature. A sub-optimal temperature may be useful where less-than full enzymatic activity is desired, such as when relatively greater amounts of exogenous enzyme are used or when multiple exogenous enzymes are used. The hold time and hold temperature will vary according to a number of factors, including but not limited to the properties of the enzyme or enzymes in use, the composition of the meat product, and the desired results. Suitable hold temperatures may be determined empirically by holding test meat products at a variety of temperatures and assessing the effect on the finished product.

In some embodiments, the hold temperature is adjusted or varied during the hold time. In some embodiments, the meat product is maintained at a first hold temperature for a first hold time, a second hold temperature for a second hold time, and a third hold temperature for a third hold time.

According to the methods, the hold time may be adjusted to achieve a desired level of preservative compound in the meat product. For example, the hold time may increased to permit more time for exogenous enzymes to promote the production of preservative compound, thereby increasing the amount of preservative compound in the final product. Likewise, where a lesser amount of preservative compound is desired in the finished product, the hold time may be decreased. In some embodiments, the hold time is adjusted to achieve a desired level of propionic acid in the final product. In some embodiments, the level of propionic acid in the final product is from about 0.1 wt % to about 1.0 wt %. In some embodiments, the level of propionic acid in the final product is about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, or about 1.0 wt %.

In some embodiments, exogenous enzymes are distributed throughout the meat and the propionic acid produced in situ throughout the meat product to a desired level. In some embodiments, the level of propionic acid in the meat product is from about 0.1 wt % to about 0.5 wt %. In some embodiments, the level of propionic acid in the meat product is from about 0.1 wt % to about 1.0 wt %. In some embodiments, propionic acid is produced as a "batch source" comprising a small portion of meat to which exogenous enzymes are added and in which propionic acid is produced to a level higher than the desired level for the final product. The batch source of propionic acid is then mixed with a larger portion of meat to generate a meat product comprising propionic acid of the desired level for the finished product. In some embodiments, exogenous enzymes in the batch source are heat inactivated prior to mixing the batch source with the larger portion of meat. In some embodiments, exogenous enzymes in the batch source are not heat inactivated prior to mixing the batch source with the larger portion of meat.

In some embodiments, the methods comprise producing a propionic acid ingredient for use in a processed meat product, comprising preparing a batch source of propionic acid and subsequently removing the water content from the batch source. The water may be removed from the batch source using methods known in the art, including but not limited to freeze-drying, air drying, and heating. In some embodiments, exogenous enzymes in the batch source are heat inactivated prior to removal of the water content. In some embodiments, exogenous enzymes in the batch source are not heat inactivated prior to removal of the water content. In some embodiments, dehydration of the batch source is accomplished simultaneous to heat inactivation of the exogenous enzymes.

In some embodiments, the methods include heating the meat product subsequent to the processing and/or hold time to simultaneously cook the meat component and inactivate the exogenous enzyme. Cooking may be accomplished by any method known in the art, including but not limited to boiling, steaming, frying, deep frying, baking, broiling, microwaving, or grilling. What constitutes adequate cooking of a meat product will vary according to the particular meat product in question, industry standards, and consumer preferences, and will be a function of both the temperature at which the meat product is cooked and the length of time it is maintained at the cook temperature. Typically, cooking is accomplished by raising the temperature of the meat product to a temperature of about 68° C. to about 74° C. Adequate cooking may be assessed empirically by methods known in the art, including an assessment of the texture of the meat product with respect to springiness, gumminess, softness, hardness, cohesiveness, and/or chewiness. In some embodiments, the meat product is raised to a temperature of about 68° C., about 69° C., about 70° C., about 71° C., about 72° C., about 73° C., or about 74° C. In some embodiments, the meat product is raised to a temperature above 79° C. In some embodiments, the cook time ranges from about 10 minutes to about 6 hours. In some embodiments, the cook time is about 10, about 15, about 20, about 25, about 30, about 35, about 40, about 45, about 50, about 55, or about 60 minutes. In some embodiments, the cook time about 1, about 2, about 3, about 4, about 5, or about 6 hours. In some embodiments, the cook time is greater than 6 hours.

In some embodiments, exogenous enzymes added to the meat are not heat inactivated. In some embodiments, the exogenous enzymes are inactive or very slow acting at low temperature such that the desired reactions occur during the manufacturing, cooking, and cooling of the meat product, with refrigeration of the finished meat product sufficient to prevent additional enzyme activity over the shelf-life of the product. In some embodiments, the exogenous enzyme substrate is depleted during meat processing such that no additional enzyme activity occurs over the shelf-life of the product. In some embodiments, additional exogenous enzyme activity over the shelf-life of the meat product does not have a negative effect on the characteristics of the product. In some embodiments, additional exogenous enzyme activity over the shelf-life of the meat product has a positive effect on the characteristics of the meat product.

Aspects of the methods may be adjusted accordingly to achieve desired results, such as the choice of exogenous enzymes, the amount of enzymes added to the meat product, the hold temperature, the hold time, the amount of sodium added, the cook time, or the cook temperature. The effectiveness of particular adjustments to the methods may be assessed objectively or subjectively using methods known in the art. Objective determinations may include but are not limited to texture profiling with respect to the springiness, gumminess, softness, hardness, cohesiveness, and/or chewiness of the final meat product. Subjective determinations may include but are not limited to the overall appearance of the final meat product and consumer preference for the product.

The methods are useful for producing a naturally preserved meat product by the addition of one or more exogenous enzymes or microorganisms producing enzymes that promote the production of a preservative compound in the meat product. The enzymes alter the biochemical, molecular, or macromolecular composition of the meat product such that an enzyme treated product contains a higher level of preservative as compared to a meat product not treated with the one or more enzymes.

The technology thus generally described will be further illustrated by the following, non-limiting examples.

EXAMPLES

Example 1

A quantity of meat, or meat by-product is treated with exogenous enzymes to generate propionic acid in the meat or meat by-product. The meat-enzyme mixture is held at a temperature and for a time period sufficient for the meat-enzyme reaction to occur and generate propionic acid at a high concentration (e.g. about 6 wt %). This enzyme-treated meat ingredient with a high concentration of propionate will be then be added to raw meat blends used to produce finished products in order to achieve efficacious levels of propionic acid in finished products (0.2%+as propionate). The enzyme-treated meat ingredient may optionally be treated with heat to inactivate the enzyme prior to addition of the ingredient to raw meat blends.

Example 2

The high concentration meat-exogenous enzyme mixture from Example 1 is added to a meat or meat mixture during blending for producing a sausage, hot dog, lunch meat, or the like, at a concentration that will achieve a desired amount of propionic acid in the meat (i.e. from about 0.1 wt % to about 0.5 wt % as propionate). The meat-exogenous enzyme mixture is then held at a temperature and for a time period sufficient for the meat-enzyme reaction to occur and generate propionic acid. The hold is carried out either in a batch processor or in the casing of the sausage, hot dog, lunch meat or the like after filling. After the desired amount of propionic acid is generated, the exogenous enzyme is deactivated by cooking of the meat.

Example 3

Exogenous enzymes to produce propionic acids in meats are added to a meat or meat mixture during blending for producing a sausage, hot dog, lunch meat, or the like, at a concentration that will achieve a desired amount of propionic acid in the meat (i.e. from about 0.1 wt % to about 0.5 wt % as propionate). The meat-exogenous enzyme mixture is then held at a temperature and for a time period sufficient for the meat-enzyme reaction to occur and generate propionic acid. The hold is carried out either in a batch processor or in the casing of the sausage, hot dog, lunch meat or the like after filling. After the desired amount of propionic acid is generated, the exogenous enzyme is deactivated by cooking of the meat.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms 'comprising,' 'including,' 'containing,' etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While several, non-limiting examples have been illustrated and described, it should be understood that changes and modifications can be made therein in accordance with ordinary skill in the art without departing from the invention in its broader aspects as defined in the following claims.

What is claimed is:

1. A method comprising:
   forming a first portion of meat by adding *Propionibacterium* to a meat substrate;
   artificially inducing glycolysis in the meat substrate;
   incubating the first portion of meat to achieve a first propionic concentration in excess of 1% wt.;
   after the incubating, mixing the first portion of meat with a second portion of meat to form a third portion of meat, wherein the third portion of meat has a third propionic acid concentration of 0.1%-1% wt., inclusive.

2. The method of claim 1, wherein the first propionic concentration is in excess of 2% wt. and the third concentration is less than 0.5% wt.

3. The method of claim 2, comprising heating the meat substrate prior to the mixing;
   the Propionibacterium being *Propionibacterium freudenreichii*.

4. The method of claim 2, comprising:
   freeze-drying the meat substrate prior to the mixing;
   measuring concentration of propionic acid in the first portion of meat.

5. The method of claim 1, comprising artificially inducing the glycolosis in the meat substrate by contacting the meat substrate with a phosphorylase.

6. The method of claim 1, comprising artificially inducing the glycolysis in the meat substrate by adding a phosphorylase to the meat substrate, the *propionibacterium* consuming the glycogen degradation products resulting from the glycolysis, both the first portion of meat and the second portion of meat being ground.

7. The method of claim 6, wherein the second portion of meat is raw at the time of mixing.

8. The method of claim 7, comprising cooking the third portion of meat;
   the second portion of meat being heavier than the first portion of meat.

9. The method of claim 8, comprising: holding the first portion of meat at a first hold temperature for a first amount of time in excess of one hour and thereafter, holding the first portion of meat at a second hold temperature for a second amount of time in excess of one hour.

10. The method of claim 9, wherein the first and second hold temperatures are different and both less than 20 degrees Celsius.

11. The method of claim 10, wherein the second portion of meat is substantially free of propionic acid prior to the mixing.

12. The method of claim 1, wherein the second portion of meat is substantially free of propionic acid prior to the mixing.

13. The method of claim 12, wherein substantially the entire quantity of propionic acid in the third portion of meat was generated by the *propionibacterium* reacting with the meat substrate.

14. The method of claim 1, comprising stuffing at least some of the third portion of meat in a casing;
   wherein for a span of time beginning with the addition of the propionibacterium through the stuffing, no external form of propionic acid is contacted with the meat substrate;
   the third portion of meat comprising the meat substrate;
   the second portion of meat being heavier than the first portion of meat.

15. The method of claim 1, comprising measuring and recording the first propionic acid concentration before the mixing.

* * * * *